RE. 24864
Oct. 9, 1956 N. W. PARKER 2,766,321
COLOR DEMODULATOR OUTPUT CONTROLLED SUBCARRIER OSCILLATOR
Filed Dec. 6, 1952
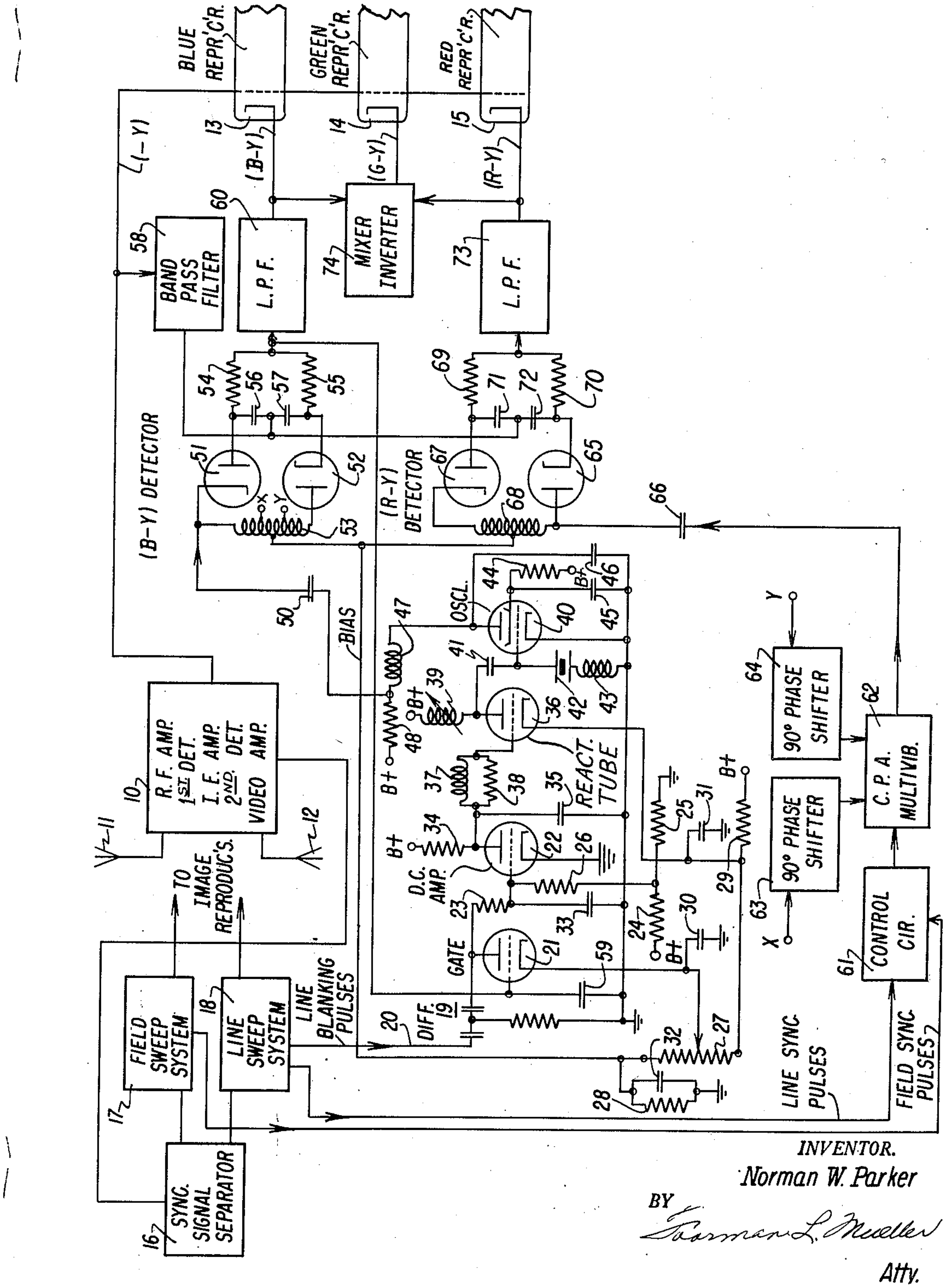
INVENTOR.
Norman W. Parker
BY Norman L. Mueller
Atty.

United States Patent Office 2,766,321

Patented Oct. 9, 1956

2,766,321

COLOR DEMODULATOR OUTPUT CONTROLLED SUBCARRIER OSCILLATOR

Norman W. Parker, Park Forest, Ill., assignor to Motorola, Inc., Chicago, Ill., a corporation of Illinois Application December 6, 1952, Serial No. 324,496

5 Claims. (Cl. 178—5.4)

This invention relates to a color television system of the NTSC type in which monochrome information is radiated as a modulation component of a main carrier wave and color information is concurrently radiated as modulation components of one or more sub-carriers which, in turn, are modulated on the main carrier. More particularly, the invention is concerned with an improved television receiver for utilizing such a color television signal.

In order to achieve compatibility with existing monochrome television receivers, a color television system designated NTSC has been devised in which separate video signals are obtained at the transmitter from a suitable picture converting means representing various primary color intensities of the scene to be televised. These signals are combined in selected proportions to constitute a monochrome video signal which, in turn, is combined with line and field synchronizing components to form a television signal which is modulated on a main carrier wave. The resulting television signal is so constituted that it conforms in all respects with present day monochrome standards and may be reproduced in black and white in existing monochrome receivers. To enable the televised scene to be reproduced in color in a color television receiver, the various color video signals are mixed with the monochrome signal at the transmitter to derive a series of "color-difference" video signals, the latter being modulated on suitable sub-carriers which, in turn, are modulated on the main carrier of the television signal.

Full details of the NTSC color television system outlined above may be found in the February 1952 edition of Electronics magazine, published by McGraw-Hill Corporation, in an article entitled "Principles of NTSC compatible color television" by C. J. Hirsch, et al., at page 88 of that publication. As mentioned in the article, it is usual in a three color television system to modulate the color difference signal $(b-y)$ corresponding to the difference between the blue video signal and the monochrome video signal on a sub-carrier having a certain phase and frequency. In addition, the color difference signal $(r-y)$ corresponding to the difference between the red video signal and the monochrome video signal is modulated on a sub-carrier having the frequency of the first mentioned sub-carrier but in phase quadrature therewith. It is only necessary to send the two previously mentioned color difference signals with the television signal, since the green color difference signal $(g-y)$ may be reconstituted at the receiver by a comparison of the other two color difference signals, this being a well-known expedient referred to in the previously mentioned article.

It is desirable to establish the color sub-carriers at a relatively high frequency (for example, at approximately 3.9 megacycles) to reduce the visibility and distorting effects of the color modulation components in black and white receivers. This limits the frequency range over which upper sideband transmission may be used for the relatively broad $(r-y)$ color sub-carrier modulation components due to the limitations in allowed band width for the television signal and limitations in the response characteristics of commercial television receivers. However, the lower side bands of this subcarrier may extend for a considerable range. These unequal side bands result in crosstalk, but such crosstalk is effectively neutralized in the NTSC color television system by reversing the phase of the $(r-y)$ subcarrier for the second field of each frame of the television signal. When this is done, however, it is necessary to control the demodulator for the $(r-y)$ sub-carrier at the receiver so that the $(r-y)$ modulation components can be recovered despite the phase reversal of their sub-carrier. That is, it is usual practice to reverse the phase of the $(r-y)$ demodulating wave developed at the receiver in time coincidence with the phase reversals in the $(r-y)$ sub-carrier and in the proper sense so that the sub-carrier reversals will have no effect on the demodulation process.

It is usual in the NTSC color television system to include in the television signal bursts of a reference signal of the same frequency as the color sub-carriers and in phase with the $(r-y)$ color sub-carrier, these bursts being impressed upon successive line blanking pulses in the television signal. It is known to recover the aforementioned bursts from the color television signal by a gating action and to apply the recovered bursts to an automatic frequency control circuit associated with an oscillator. The recovered bursts and the output signal from the oscillator are compared in the automatic frequency control circuit to develop a control signal which is utilized to control the oscillator so that its output signal is a continuous wave of the proper frequency and phase to be used as a demodulating signal for the color sub-carriers. In the receiver of this invention, the oscillator which develops the continuous wave demodulating signal is precisely controlled in a new and improved fashion and without need for an associated phase detector or the like.

It is, accordingly, an object of this invention to provide a new and improved color television receiver for use in the NTSC type of color television system in which demodulation components of the color sub-carriers are recovered in a simplified fashion.

Another object of the invention is to provide such an improved color television receiver in which a demodulating signal for recovering the modulation components of the color sub-carriers is produced by means of a simple and effective circuit.

Yet another object of the present invention is to provide such a color television receiver in which the oscillator circuit for developing the demodulating wave utilized to recover the modulation components of the color subcarriers is controlled by means of a relatively simple circuit precisely to maintain the demodulating signal at a selected frequency and phase.

A feature of the invention is the utilization of the output signal of one of the color sub-carrier detectors of the receiver to develop a control signal having amplitude variations corresponding to variations in phase between the color sub-carrier and the demodulating signal developed by an oscillator in the receiver, and for using this control signal to control such oscillator so as to maintain a selected phase relation between the demodulating signal and the color sub-carriers.

The above and other features of the invention which are believed to be new are set forth with particularity in the appended claims. The invention itself, however, together with further objects and advantages thereof, may best be understood by reference to the following description when taken in conjunction with the accompanying drawing in which the single figure shows a color television receiver for operation in the NTSC type of color television system and which is constructed in accordance with the present invention.

The color television receiver of this invention is constructed to utilize a color television signal which includes color difference components modulated on a subcarrier wave, and which further includes recurring bursts of a signal having a selected phase and frequency with respect to the subcarrier. The receiver comprises a detector for recovering the modulation components of the aforementioned subcarrier in response to a demodulating signal having a frequency and phase corresponding to the frequency and phase of the aforementioned subcarrier and subject to develop additional signal components corresponding to the aforesaid signal bursts with amplitude variations related to phase variations between the demodulating signal and the subcarrier. The receiver includes an oscillator for developing a demodulating signal and for supplying such a demodulating signal to the detector, and a control circuit is coupled to the oscillator for controlling the frequency and phase of the demodulating signal developed thereby. A gate circuit is coupled to the detector and is actuated at the times of occurrence of the aforementioned bursts for developing a control signal having amplitude variations corresponding to amplitude variations of the additional signal components mentioned previously that are developed by the detector, and means is provided for applying the control signal to the control circuit for maintaining the demodulating signal at the frequency and phase of the aforementioned subcarrier.

The color television receiver of Fig. 1 includes the usual radio frequency amplifier, first detector, intermediate frequency amplifier, second detector and video amplifier connected in cascade and indicated generally as 10, the input terminals of the radio frequency amplifier being connected to a suitable antenna 11, 12 and the output terminals of the video amplifier being connected to the control electrodes of image reproducing devices 13, 14 and 15. Devices 13, 14 and 15 are utilized respectively to develop the blue, green and red images which are subsequently combined optically in well-known fashion to obtain a full color image. When so desired, and as is well understood to the art, devices 13, 14 and 15 may be combined within a single envelope.

Unit 10 is also connected to a synchronizing signal separator stage 16 which removes the line and field synchronizing components from the television signal. Separator 16 is connected to a field sweep system 17 and to a line sweep system 18 which, in turn, are coupled respectively to the field and line deflection element of the image reproducers 13, 14 and 15. Line sweep system 18 develops line blanking pulses during line retrace intervals in well-known fashion, and supplies these blanking pulses to a differentiating circuit 19 over a lead 20. Differentiating circuit 19 is coupled to the anode of an electron discharge device 21 which is intended to function as a gate circuit. The anode of device 21 is connected to the control electrode of a direct-current amplifier discharge device 22 through a resistor 23; the control electrode being connected to the junction of a pair of potentiometer resistors 24, 25 through a resistor 26, and the potentiometer resistors being connected between the positive terminal B+ of a source of unidirectional potential and ground. The cathode of discharge device 21 is connected to a variable tap on resistor 27 which, in conjunction with resistors 28 and 29 connected between the positive terminal of the unidirectional source and ground, functions as a variable bias source for device 21. The cathode of device 21 is coupled to ground through a by-passing capacitor 30, the junction of resistors 27 and 29 are by-passed to ground through capacitor 31, and resistor 28 is shunted by a by-passing capacitor 32.

The control electrode of D. C. amplifier 22 is by-passed to ground through a capacitor 33, the cathode of the amplifier is connected to ground, and the anode is connected to the positive terminal B+ through a load resistor 34. The anode of device 22 is by-passed to ground through a capacitor 35 and is connected to the control electrode of an electron discharge device 36 through an inductance coil 37 shunted by a resistor 38. Device 36 functions as a reactance tube and has its cathode connected to the junction of resistors 27 and 29 to obtain a positive bias and also has its anode connected to the positive terminal B+ through an inductance coil 39. The anode of device 36 is coupled to the control electrode of a beam tube 40 through a coupling capacitor 41, the last mentioned control electrode being coupled to ground through a crystal 42 and inductance coil 43. Device 40 is connected as a crystal controlled oscillator and has its cathode connected to ground and its beam forming electrode connected to the positive terminal B+ through a resistor 44 and by-passed to ground through a capacitor 45. The anode of device 40 is by-passed to ground through a capacitor 46 and is connected to the positive terminal B+ through an inductance coil 47 and resistor 48.

The junction of inductance coil 47 and resistor 48 is connected through a coupling capacitor 50 to the cathode of a diode 51. Diode 51 and a further diode 52 are connected to form a phase detector of the type disclosed and claimed in copending application Serial No. 322,763; filed November 26, 1952; in the name of Kurt Schlesinger; and assigned to the present assignee. The cathode of device 51 is coupled to the anode of device 52 through an inductance coil 53 having a center tap connected to the junction of resistors 27 and 28 to obtain a positive bias for the diodes. The anode of diode 51 is connected to the cathode of diode 52 through a pair of series resistors 54 and 55 and through a pair of series capacitors 56 and 57 connected in parallel with the resistors.

The output of the video amplifier of unit 10 is also connected through a band-pass filter 58 to the junction of capacitors 56 and 57. The junction of resistors 54 and 55 is connected to the control electrode of gate discharge device 21, this control electrode being by-passed to ground through a capacitor 59. The junction of resistors 54 and 55 is also connected through a low-pass filter 60 to the cathode of the reproducing device 13.

Field sweep system 17 and line sweep system 18 respectively apply line and field synchronizing pulses to a control circuit 61 which is connected to a color phase alternation multivibrator 62. The multivibrator is further connected through 90° phase shifters 63 and 64 to respective points $x$ and $y$ on inductance coil 53. The output terminals of multivibrator 62 are coupled to the anode of a diode 65 through a coupling capacitor 66. Diode 65 and a further diode 67 are connected as a phase detector similar to the phase detector of diodes 51 and 52. The cathode of diode 67 is coupled to the anode of diode 65 through an inductance coil 68 having a center tap connected to the junction of resistors 27 and 28 to derive a positive bias for the diodes. The anode of diode 67 is connected to the cathode of diode 65 through a pair of series-connected resistors 69 and 70, the resistors being shunted by a pair of series-connected capacitors 71 and 72. The output terminals of band-pass filter 58 are also connected to the junction of capacitors 71 and 72. The junction of resistors 69 and 70 is coupled through a low-pass filter 73 to the cathode of the red image reproducing device 15. The cathode of the blue image reproducing device 13 and the cathode of the red image reproducing device 15 are connected to a mixer inverter 74 which, in turn, is connected to the cathode of the green image reproducing device 14.

As previously stated, the receiver of Fig. 1 is intended to operate in an NTSC color television system and to utilize a color television signal which includes line and field synchronizing components and a monochrome video frequency component. The television signal also includes a first sub-carrier of reference frequency and phase which is modulated in accordance with the **(*r*−*y*)**

color difference signal, a second sub-carrier having the same frequency as the first sub-carrier but in phase quadrature therewith modulated in accordance with the $(b-y)$ color difference signal, and bursts of a signal having the frequency and phase of the $(r-y)$ sub-carrier impressed on the line blanking pedestals. Moreover, in accordance with NTSC principles, the phase of the $(r-y)$ sub-carrier is inverted during the second field of each frame of the color television signal.

The color television signal described above is intercepted by antenna 11 and 12 and the intercepted signal is amplified by the radio frequency amplifier of unit 10, heterodyned to the selected intermediate frequency of the receiver, again amplified in the intermediate frequency amplifier and detected in the second detector to produce a composite video signal which is amplified by the video amplifier and appears at the output terminals of unit 10. The composite video signal includes the monochrome video frequency components $(y)$, and also includes the two color difference signal sub-carriers and the reference signal bursts. This composite video signal is applied to the control electrodes of reproducers 13, 14 and 15 so that the cathode-ray beams therein are modulated in accordance with the monochrome video frequency components. The color sub-carriers and reference bursts are also supplied to the control electrodes but due to their relatively high frequency have little effect on the image reproduction.

Band-pass filter 58 translates the color sub-carriers and applies them to phase detectors 51, 52 and 65, 67. A demodulating signal having the frequency and phase of the $(b-y)$ color sub-carrier is supplied to phase detector 51, 52 in a manner to be described, enabling the last mentioned phase detector to recover the modulation components of the $(b-y)$ sub-carrier which are supplied to the cathode of image reproducing device 13 through low-pass filter 60. Since the cathode of reproducer 13 is modulated by the $(b-y)$ signal and the control electrode is modulated by the $(y)$ signal, the net modulation of the cathode ray beam in device 13 is in accordance with the blue video information.

Detector 65, 67 receives a demodulating signal from multivibrator 62 having the frequency and phase of the $(r-y)$ sub-carrier and whose phase is inverted coincidentally with inversions in the $(r-y)$ sub-carrier so that detector 65, 67 is able to recover the $(r-y)$ information which is supplied to the cathode of reproducing device 15 through low-pass filter 73. In this instance, the net modulation of the cathode-ray beam in reproducing device 15 is in accordance with the red information. In known fashion, the $(r-y)$ information and $(b-y)$ information is mixed in mixer inverter 74 to derive $(g-y)$ information, the latter being supplied to the cathode of reproducing device 14 so that the net modulation in that device is in accordance with green information. Therefore, device 13 reproduces the blue colors of the televised scene, device 14 reproduces the green colors and device 15 the red colors which, as previously noted, may be combined optically for full color reproduction.

Line sweep system 18, as previously pointed out, develops a blanking pulse on lead 20 during each line retrace, and this blanking pulse is differentiated in differentiating network 19 to produce a positive pulse on the plate of gate 21 in time coincidence with each of the aforementioned bursts of reference $(r-y)$ signal in the television signal. The output signal from phase detector 51, 52 is applied to the control electrode of gate discharge device 21 and by integration an amplified direct current (D. C.) control signal is developed across resistor 26 having amplitude variations corresponding to amplitude variations in the output signal of phase detector 51, 52 at times corresponding to the occurrence of the aforementioned signal bursts. This D. C. control signal is amplified by D. C. amplifier 22 and supplied to the control electrode of reactance tube 36 to vary the current flow through the latter tube. Reactance tube 36 is connected in well-known fashion in circuit with crystal oscillator 40 to control the frequency of the crystal oscillator. The circuit parameters of the oscillator are such that it develops a signal having the frequency of the color sub-carriers and supplies that signal to detector 51, 52 to function as the demodulating signal for the $(b-y)$ sub-carrier. When the last mentioned demodulating signal is in phase with the $(b-y)$ sub-carrier, the $(b-y)$ modulation components are recovered at the output of the detector, and there is no output from the detector at times corresponding to the aforementioned signal bursts since they are in phase quadrature with the $(b-y)$ sub-carrier. However, should the phase of the demodulating signal from oscillator 40 shift with respect to the $(b-y)$ sub-carrier, detector 51, 52 develops signal components having amplitude variations extending from zero when the demodulating signal is in phase with the $(b-y)$ sub-carrier to a maximum when the demodulating signal is in phase quadrature with the $(b-y)$ sub-carrier. These signal components are selected by gate 21 so that the control signal applied to reactance tube 36 also has amplitude variations corresponding to phase variations between the demodulating signal and the $(b-y)$ sub-carrier. The reactance tube circuit is constructed to control the frequency of oscillator 40 to tend to reduce the amplitude of the aforementioned signal components to zero and thus maintain the demodulating signal in phase with the $(b-y)$ sub-carrier so that demodulation components of that sub-carrier are produced by the detector with maximum amplitude and the phase quadrature $(r-y)$ sub-carrier and signal bursts do not appear in the output circuit thereof.

Control circuit 61 is constructed in known fashion to respond to the line and field synchronizing pulses from sweep systems 17 and 18 to trigger multivibrator 62 during alternate fields of each frame of the television signal. The $(b-y)$ demodulating signal from oscillator 40 with positive and negative phase is obtained from respective points $x$ and $y$ on inductance coil 53 and supplied to the multivibrator through 90° phase shifters 63 and 64. Due to the action of the phase shifters, a $+ (r-y)$ demodulating signal and a $- (r-y)$ demodulating signal is supplied to the multivibrator and one or the other is translated thereby under the control of control circuit 61 so that a $+ (r-y)$ demodulating signal is supplied to detector 65, 67 when the $(r-y)$ sub-carrier has positive phase and a $- (r-y)$ demodulating signal is supplied to the detector when the $(r-y)$ sub-carrier has negative phase so that the phase detector continues to perform its demodulating function regardless of phase reversals of the $(r-y)$ sub-carrier.

The present invention provides, therefore, an improved color television receiver in which the demodulating signal oscillator for the color sub-carrier detectors is precisely controlled in accordance with the output derived from one of the detectors so that the phase of the demodulating signal is precisely and directly controlled and the detector produces the modulation components of a selected sub-carrier with maximum amplitude and discriminates against phase quadrature signals. It is apparent that a like control could be obtained from the output of the $(r-y)$ detector with the control circuit for the oscillator responding to maximum amplitude of the signal components corresponding to the $(r-y)$ bursts to control the oscillator. In accordance with the invention, the demodulating signal oscillator does not require an additional phase detector, but is controlled directly to produce a desired effect, that is, to produce with maximum amplitude the modulation components of a selected sub-carrier at the output of the phase detector.

While a particular embodiment of the invention has been shown and described, modifications may be made and it is intended in the appended claims to cover all such modifications as fall within the true spirit and scope of the invention.

I claim:

1. A color television receiver for utilizing a color television signal which includes color difference components modulated on a sub-carrier wave and which further includes recurring bursts of a signal having a selected phase and frequency with respect to said sub-carrier, said receiver including in combination, apparatus for receiving the color television signal and for deriving the modulated sub-carrier and the recurring signal bursts, detector means for recovering the modulation components of the aforesaid sub-carrier in response to a demodulating signal having a frequency and phase corresponding to the frequency and phase of the aforesaid sub-carrier, a selector network coupled to said apparatus for applying the modulated sub-carrier and the recurring signal bursts to said detector means, said detector being subject to develop further signal components corresponding to the aforesaid signal bursts with amplitude variations related to phase variations between the aforesaid demodulating signal and sub-carrier, apparatus for developing such a demodulating signal and for supplying the demodulating signal to said detector means, utilization means for the modulation components and the sub-carrier coupled to said detector means, a control means coupled to said last mentioned apparatus for controlling the frequency and phase of the demodulating signal developed thereby, a circuit coupled to said detector means and actuated at the times of occurrence of the aforesaid bursts for developing a control signal having amplitude variations corresponding to amplitude variations of the aforesaid further signal components developed by said detector means, and means for applying said control signal to said control means for maintaining the frequency and phase of the demodulating signal developed thereby at values corresponding to the frequency and phase of the aforesaid sub-carrier.

2. A color television receiver for utilizing a color television signal which includes color difference components modulated on a sub-carrier wave and which further includes recurring bursts of a signal having a selected phase and frequency with respect to said sub-carrier, said receiver including in combination, apparatus for receiving the color television signal and for deriving the modulated sub-carrier and recurring signal bursts, detector means for recovering the modulation components of the aforesaid sub-carrier in response to a demodulating signal having a frequency and phase corresponding to the frequency and phase of the aforesaid sub-carrier, a selector network coupled to said apparatus for applying the modulated sub-carrier and the recurring signal bursts to said detector means, said detector being subject to develop further signal components corresponding to the aforesaid signal bursts with amplitude variations related to phase variations between the aforesaid demodulating signal and sub-carrier, apparatus for developing such a demodulating signal and for supplying the demodulating signal to said detector means, utilization means for the modulation components of the sub-carrier coupled to said detector means and control means for utilizing the aforesaid further signal components developed by said detector means to control said last mentioned apparatus and maintain the frequency and phase of the demodulating signal developed thereby at values corresponding to the frequency and phase of the aforesaid sub-carrier.

3. A color television receiver for utilizing a color television signal which includes color difference components modulated on a sub-carrier wave having a selected frequency and phase and which further includes recurring bursts of a signal having the same frequency as the sub-carrier but in phase quadrature therewith, said receiver including in combination, apparatus for receiving the color television signal and for deriving the modulated sub-carrier and recurring signal bursts detector means for recovering the modulation components of the aforesaid sub-carrier in response to a demodulating signal having a frequency and phase corresponding to the frequency and phase of the aforesaid sub-carrier, a selector network coupled to said apparatus for applying the modulated sub-carrier and the recurring signal bursts to said detector means, said detector being subject to develop further signal components corresponding to the aforesaid signal bursts in response to phase variations between the aforesaid sub-carrier and demodulating signal, said further signal components having amplitude variations corresponding to such phase variations, apparatus for developing such a demodulating signal and for supplying the demodulating signal to said detector means, utilization means for the modulation components of the sub-carrier coupled to said detector means, and control means for utilizing the aforesaid further signal components developed by said detector means to control said last mentioned apparatus and maintain the frequency and phase of the demodulating signal developed thereby at values corresponding to the frequency and phase of the aforesaid sub-carrier.

4. A color television receiver for utilizing a color television signal which includes color difference components modulated on a sub-carrier wave, and which further includes synchronizing components and recurring bursts of a signal having a selected phase and frequency with respect to said sub-carrier, said bursts having a predetermined timing with respect to said synchronizing components, said receiver including in combination, detector means for recovering the modulation components of the aforesaid sub-carrier in response to a demodulating signal having a frequency and phase corresponding to the frequency and phase of the aforesaid sub-carrier, said detector being subject to develop further signal components corresponding to the aforesaid signal bursts with amplitude variations related to phase variations between the aforesaid demodulating signal and sub-carrier, apparatus for developing such a demodulating signal and for supplying the demodulating signal to said detector means, a control means coupled to said last mentioned apparatus for controlling the frequency and phase of the demodulating signal developed thereby, a network for utilizing the aforesaid synchronizing components to develop a gating signal recurring at times corresponding to the occurrence of the aforesaid bursts, a circuit response to said gating signal for selecting the further signal components developed by said detector means to produce a control signal having amplitude variations corresponding to amplitude variations of the aforesaid further signal components, and means for applying said control signal to said control means for maintaining the frequency and phase of the demodulating signal developed by said last mentioned apparatus at values corresponding to the frequency and phase of the sub-carrier.

5. A color television receiver for utilizing a color television signal which includes color difference components modulated on a sub-carrier wave having a selected frequency and phase, and which further includes synchronizing components and recurring bursts of a signal having the same frequency as the sub-carrier but in phase quadrature therewith, said bursts having a predetermined timing with respect to said synchronizing components, said receiver including in combination, a phase detector for recovering the modulation components of the aforesaid sub-carrier in response to a demodulating signal having a frequency and phase corresponding to the frequency and phase of the aforesaid sub-carrier, said detector being subject to develop further signal components corresponding to the aforesaid signal bursts in response to phase variations between the aforesaid sub-carrier and demodulating signal, said further signal components having amplitude variations corresponding to such phase variations, an oscillator for developing such a demodulating signal of substantially the same frequency as the sub-carrier and for supplying the demodulating signal to said phase detector, a reactance circuit coupled to said oscillator for controlling the frequency of the demodulating signal developed thereby, a circuit for utilizing the aforesaid synchronizing components to develop a gating signal at times corresponding to the occurrence of the aforesaid bursts, a gate circuit responsive to said gating signal for selecting the signal components developed by said phase detector to produce a control signal having amplitude variations corresponding to amplitude variations of the aforesaid signal components, and means for applying said control signal to said reactance circuit for maintaining the frequency and phase of the demodulating signal developed by said oscillator at values corresponding to the frequency and phase of the aforesaid sub-carrier.

References Cited in the file of this patent

UNITED STATES PATENTS 2,648,722 Bradley ---------------- Aug. 11, 1953

OTHER REFERENCES

"Electronics" Magazine, February 1952, pages 88–97.

"RCA Bulletins on Color Television and UHF," bulletin entitled "A Three-Color Direct-View Receiver for the RCA Color Television System," pages 1–16, and bulletin entitled "Recent Developments in Color Synchronization in the RCA Color Television System," pages 1–11.